(12) United States Patent
Fukui

(10) Patent No.: US 7,258,358 B2
(45) Date of Patent: Aug. 21, 2007

(54) BICYCLE SEAT POST FIXING STRUCTURE

(75) Inventor: Seiji Fukui, Shimonoseki (JP)

(73) Assignee: Shimano Inc., Osaka (JP)

(*) Notice: Subject to any disclaimer, the term of this patent is extended or adjusted under 35 U.S.C. 154(b) by 11 days.

(21) Appl. No.: 11/207,907

(22) Filed: Aug. 22, 2005

(65) Prior Publication Data

US 2006/0157956 A1    Jul. 20, 2006

(30) Foreign Application Priority Data

Jan. 20, 2005   (JP)   ............... 2005-012850

(51) Int. Cl.
*B62J 1/00*    (2006.01)
*B62J 39/00*   (2006.01)
*B62K 19/00*   (2006.01)

(52) U.S. Cl. .............. 280/288.4; 280/287; 297/215.13

(58) Field of Classification Search .............. 280/220, 280/274, 275, 281.1, 283, 287, 288.4; 267/131–2; 297/195.1, 199, 215.13; 403/109.1–2, 109.4–6, 403/377–8

See application file for complete search history.

(56) References Cited

U.S. PATENT DOCUMENTS

| | | | | |
|---|---|---|---|---|
| 2,639,760 A | * | 5/1953 | Von Szilagyi | ............... 248/624 |
| 5,351,980 A | * | 10/1994 | Huang | ..................... 280/281.1 |
| 5,881,988 A | * | 3/1999 | Liu | ............... 248/601 |
| 6,095,538 A | * | 8/2000 | Maret | ......................... 280/220 |
| 6,663,076 B1 | * | 12/2003 | Tsai | ............... 248/575 |
| 7,025,522 B2 | * | 4/2006 | Sicz et al. | ............... 403/109.2 |

| | | | |
|---|---|---|---|
| 2002/0041098 A1 | | 4/2002 | Cooper |
| 2006/0078376 A1 | * | 4/2006 | Liao ........................... 403/378 |

FOREIGN PATENT DOCUMENTS

| | | |
|---|---|---|
| DE | 195 27 906 A1 | 1/1997 |
| FR | 612726 | 10/1926 |
| FR | 2 462 329 | 2/1981 |
| GB | 1021679 | 3/1996 |
| JP | 3-42487 U | 4/1991 |
| JP | 5-41994 Y2 | 10/1993 |
| SU | 1190101 A | 11/1985 |
| TW | 437656 U | 5/2001 |
| TW | 483408 U | 4/2002 |
| TW | 517674 U | 1/2003 |
| TW | 568044 U | 12/2003 |

\* cited by examiner

*Primary Examiner*—Lesley D. Morris
*Assistant Examiner*—Marc A. Scharich
(74) *Attorney, Agent, or Firm*—Global IP Counselors, LLP

(57) ABSTRACT

A bicycle seat post fixing structure includes a tubular attachment member and a tightening member. The tubular attachment member is configured to be fixed to the frame. The tubular attachment member includes a first threaded component and a first inner peripheral surface configured to receive the seat post. The tubular tightening member includes a second threaded component that mates with the first threaded component and a second inner peripheral surface configured to receive the seat post. One of the first and second threaded components is a female threaded component and the other of the first and second threaded components is a male threaded component having at least one slit formed therein. At least one of the male and female threaded components has tapered threads such that rotation of the tightening member in a tightening direction squeezes the male threaded component to hold the seat post.

20 Claims, 10 Drawing Sheets

BICYCLE SEAT POST FIXING STRUCTURE

CROSS-REFERENCE TO RELATED APPLICATIONS

This application claims priority to Japanese Patent Application No. 2005-012850. The entire disclosure of Japanese Patent Application No. 2005-012850 is hereby incorporated herein by reference.

BACKGROUND OF THE INVENTION

1. Field of the Invention

The present invention generally relates to a bicycle fixing structure. More specifically, the present invention relates to a bicycle seat post fixing structure configured to non-movably attach a bicycle seat post with a bicycle seat to a bicycle frame in a height-adjustable manner.

2. Background Information

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle. One particular component of bicycles, which has been extensively redesigned over the past years, is the bicycle seat post and the structure for attaching the seat post to the frame.

A bicycle seat or saddle is mounted at the top of a seat post. The seat post is typically height-adjustably fixed to a seat tube of the frame by means of a seat post fixing structure. With conventional seat post fixing structures, slits are provided in the lengthwise direction at the upper end of the seat tube of the frame. The seat tube can be constricted by tightening with a tightening bolt, which fixes the seat post at the desired height. More specifically, a U-shaped seat lug is installed at the upper end of the seat tube, and the tightening bolt is installed in the seat lug. A handle in the form of a bent bar is often pivotally provided to the tightening bolt, and this handle is used to turn the tightening bolt in the tightening direction, which tightens the seat tube via the seat lug and fixes the seat post (see, for example, Japanese Utility Model Publication H5-41994). Thus, providing a handle to the tightening bolt allows the saddle height to be adjusted relatively easily.

In view of the above, it will be apparent to those skilled in the art from this disclosure that there exists a need for an improved bicycle seat post fixing structure. This invention addresses this need in the art as well as other needs, which will become apparent to those skilled in the art from this disclosure.

SUMMARY OF THE INVENTION

One object of the present invention is to provide a bicycle seat post fixing structure configured to non-movably attach a bicycle seat post with a bicycle seat to a bicycle frame in a height-adjustable manner.

Another object of the present invention is to provide a bicycle seat post fixing structure, which is relatively simple and inexpensive to manufacture and assemble.

Another object of the present invention is to provide a bicycle seat post fixing structure, which has an aesthetically pleasing appearance, yet provides for secure attachment to the bicycle frame.

With the conventional seat post fixing structure described above, it is sometimes impossible to fold up the handle underneath the saddle, so that the handle hits the leg of the rider sitting astride the saddle. This can happen, for instance, when the pivot support portion of the handle becomes rusty and the handle is difficult to pivot. Also, the portion of the seat lug where a hole is provided for inserting the tightening bolt, and the handle used for tightening the tightening bolt, stick outward, which precludes a sleek design with few protruding parts, and is therefore undesirable from an aesthetic standpoint.

It is an object of the present invention to provide a seat post fixing structure with which a tightening force strong enough to fix the seat post can be obtained by a simple tightening operation, and the saddle height can be simply adjusted while still achieving an attractive design with few protruding parts.

The foregoing objects can basically be attained by providing a bicycle seat post fixing structure in accordance with a first aspect of the present invention. The bicycle seat post fixing structure is configured to adjustably attach a bicycle seat post to a bicycle frame. The bicycle seat post fixing structure includes a tubular attachment member and a tightening member. The tubular attachment member is configured to be fixed to the frame. The tubular attachment member includes a first threaded component and a first inner peripheral surface configured to receive the seat post. The tubular tightening member includes a second threaded component that mates with the first threaded component and a second inner peripheral surface configured to receive the seat post. One of the first and second threaded components is a female threaded component and the other of the first and second threaded components is a male threaded component having at least one slit formed therein. At least one of the male and female threaded components has tapered threads such that rotation of the tightening member in a tightening direction squeezes the male threaded component to hold the seat post. Preferably, the at least one slit includes a plurality of slits disposed in a spaced arrangement from each other in a peripheral direction about the male threaded component. Thus, the tubular attachment member is provided to the frame, and has one or more slits disposed spaced apart in the peripheral direction with the male threaded component and/or the female threaded component being a taper thread. The bicycle seat post fixing structure pertaining to the first aspect of the present invention is a structure that allows a seat post to which a bicycle saddle is mounted to be height-adjustably fixed to a frame.

In a bicycle seat post fixing structure in accordance with another aspect of the present invention, the first threaded component is the male threaded component and the second threaded component is the female threaded component. With this seat post fixing structure, when the seat post is mounted to the frame, the tightening member is mounted to the seat post, and then the seat post to which the tightening member has been mounted is mounted to the tubular attachment member. The saddle is then disposed at the desired height, before the tightening member is turned in the direction in which the threads are tightened. Since the male threaded component and the female threaded component are either both taper threads, or one is a taper thread and the other a straight thread, as the tightening member is tightened, the tubular attachment member is constricted at the slit portion so that the seat post is tightly squeezed, and, as a result, the seat post is fixed to the tubular attachment member. When the saddle (seat post) height is adjusted, the tightening member is temporarily loosened. As a result, the elasticity of the constricted tubular attachment member causes the tubular attachment member to return to its original shape so that the squeezing force decreases, and therefore the seat post is able to move up and down. The saddle is moved to the desired height in this state, and then the tightening member is turned in the tightening direction, which fixes the seat post to the tubular attachment member as discussed above. Here, since the seat post is fixed to the tubular attachment member by turning the tightening member and utilizing the taper thread to constrict the tubular attachment member, the height of the saddle can be adjusted merely by turning the tightening member. This means that a tightening force strong enough to fix the seat post can be obtained by a simple tightening operation, and the saddle height can be simply adjusted while still achieving an attractive design with few protruding parts.

In a bicycle seat post fixing structure in accordance with another aspect of the present invention, the tightening member includes a plurality of gripping portions formed about an outer peripheral surface thereof. In other words, the tightening member has gripping portions formed in the peripheral direction around the outer peripheral surface. In this case, since the gripping portions are formed in the peripheral direction around the outer peripheral surface, the gripping portions provide a good grip for a tool or fingers when the tightening member is turned, making it easier to turn the tightening member with more strength.

In a bicycle seat post fixing structure in accordance with another aspect of the present invention, the first threaded component is the female threaded component and the second threaded component is the male threaded component. With this arrangement, the tubular attachment member is provided to the frame, has a female threaded component on its inner peripheral surface, and allows the seat post to be passed therethrough. The tightening member is a tubular member having one or more slits disposed spaced apart in the peripheral direction, and a male threaded component that is formed around the outer peripheral surface and mates with the female threaded component, and the seat post is movably mounted on the inner peripheral surface of this tightening member. The male threaded component and/or the female threaded component is a taper thread. This bicycle seat post fixing structure allows a seat post to which a bicycle saddle is mounted to be height-adjustably fixed to a frame.

With this seat post fixing structure, when the seat post is mounted to the frame, the tightening member is mounted to the seat post, and the seat post to which the tightening member has been mounted is mounted to the tubular attachment member. The saddle is then disposed at the desired height, and the tightening member is turned in the direction in which the threads are tightened. Since the male threaded component and the female threaded component are either both taper threads, or one is a taper thread and the other a straight thread, as the tightening member is tightened, the tightening member is constricted at the slit portion, the seat post is tightly squeezed, and the seat post is fixed to the tubular attachment member. When the saddle (seat post) height is adjusted, the tightening member is temporarily loosened. As a result, the elasticity of the constricted tightening member causes the tightening member to return to its original shape, the squeezing force decreases, and the seat post is able to move up and down. The saddle is moved to the desired height in this state, and the tightening member is turned in the tightening direction, which fixes the seat post to the tubular attachment member as discussed above. Here, since the seat post is fixed to the tubular attachment member by turning the tightening member and utilizing the taper thread to constrict the tightening member member, the height of the saddle can be adjusted merely by turning the tightening member. Thus, a seat post fixing structure is provided with which a tightening force strong enough to fix the seat post can be obtained by a simple tightening operation, and the saddle height can be simply adjusted while still achieving an attractive design with few protruding parts.

In a bicycle seat post fixing structure in accordance with another aspect of the present invention, the tightening member includes a plurality of gripping portions formed about an outer peripheral surface thereof at an end closer to the saddle than the male threaded component. In other words, the tightening member has gripping portions formed in the peripheral direction around the outer peripheral surface on the side closer to the saddle than the male threaded component. In this case, since the gripping portions are formed in the peripheral direction alongside the male threaded component on the outer peripheral surface of the tightening member, the gripping portions provide a good grip for a tool or fingers when the tightening member is turned, making it easier to turn the tightening member with more strength.

In a bicycle seat post fixing structure in accordance with another aspect of the present invention, the slits extend in an axial direction substantially corresponding to an axial movement direction of the seat post during adjustment. In other words, the slits are formed in the movement direction of the seat post. In this case, since the slits are disposed in the movement direction of the seat post, the tubular attachment member or tightening member is more efficiently constricted.

In a bicycle seat post fixing structure in accordance with another aspect of the present invention, both the male threaded component and the female threaded component have tapered threads. In other words, the male threaded component and the female threaded component are both taper threads. In this case, since the male threaded component and the female threaded component are both taper threads, depending on how the taper angle of each taper thread is set, the tightening force of the tubular attachment member or tightening member per turn can be increased or decreased when the tightening member is turned, making it possible to achieve a variety of tightening characteristics.

In a bicycle seat post fixing structure in accordance with another aspect of the present invention, one of the male and female threaded components has tapered threads, and the other of the male and female threaded components has straight threads. In other words, either the male threaded component or the female threaded component is a taper thread, and the other is a straight thread. In this case, less machining is involved since there is only one type of taper thread, which is more difficult to machine than a straight thread.

In a bicycle seat post fixing structure in accordance with another aspect of the present invention, the tapered threads are pipe threads. In other words, the taper thread is a pipe thread. In this case, the taper thread can be formed more inexpensively since a general-purpose thread is utilized.

In a bicycle seat post fixing structure in accordance with another aspect of the present invention, the tubular attachment member is an integral, unitary part of a seat tube of the bicycle frame. In other words, the tubular attachment member is formed integrally with the seat tube of the bicycle frame. In this case, since the tubular attachment member is formed integrally with the seat tube, the tubular attachment member has greater strength.

In a bicycle seat post fixing structure in accordance with another aspect of the present invention, the tubular attachment member includes a fastening structure that is configured to be coupled to a seat tube of the bicycle frame. In other words, the tubular attachment member is separate from the seat tube of the bicycle frame, and is fastened to the seat tube. In this case, since the tubular attachment member is separate from the seat tube, the tubular attachment member can be fixed to various types of frame by a suitable fastening means, such as threading, welding, adhesive bonding, or crimping. Also, the seat post can be prevented from coming loose by fastening the tubular attachment member to the frame after the seat post has been attached.

With the present invention, since the seat post is fixed to the tubular attachment member or the tightening member by turning the tightening member and utilizing at least one set of tapered threads (a taper thread) to constrict the tubular attachment member or the tightening member, a tightening force strong enough to fix the seat post can be obtained by a simple tightening operation, and the saddle height can be simply adjusted while still achieving an attractive design with few protruding parts.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
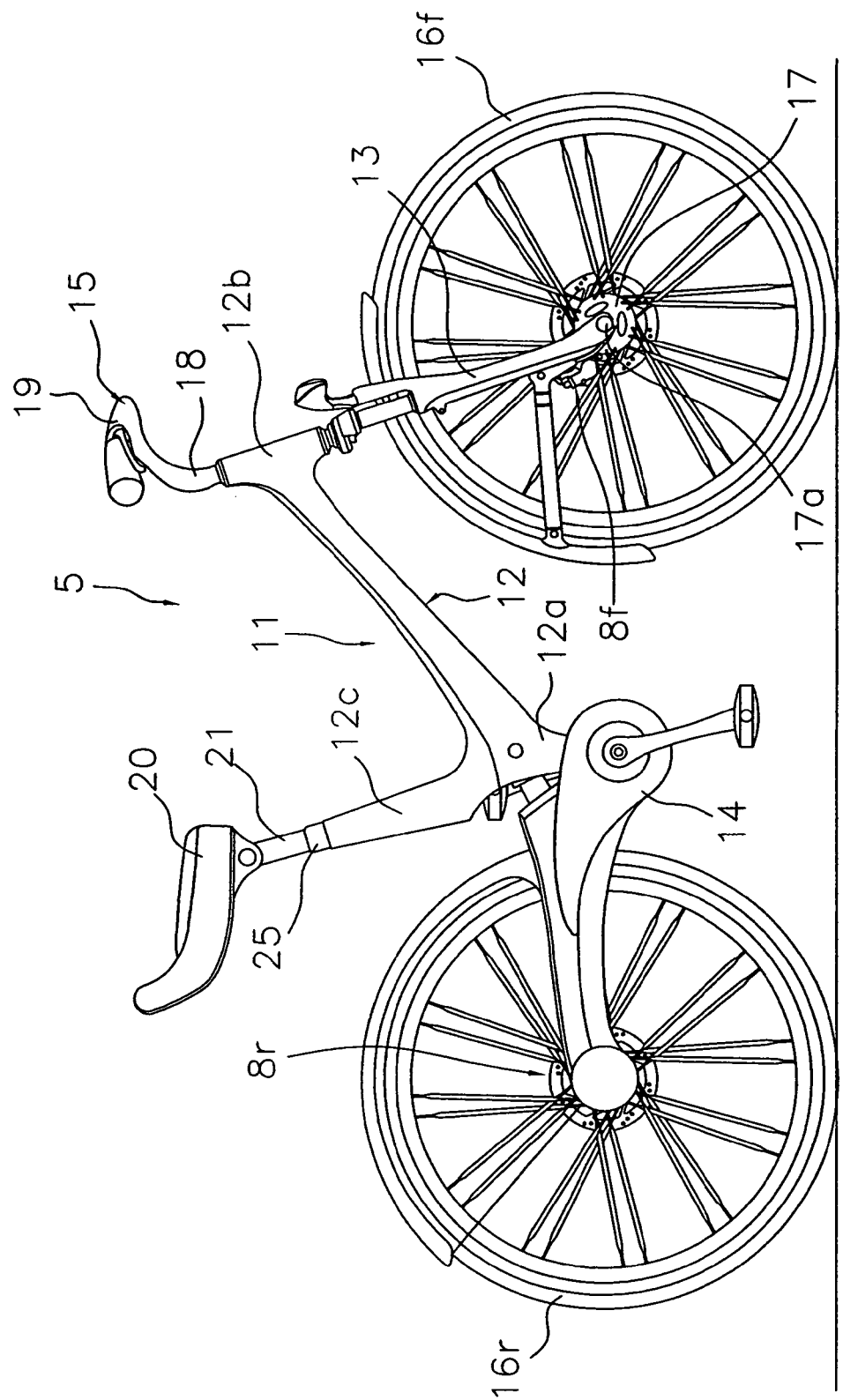
FIG. 1 is a side elevational view of a bicycle with a seat post fixing structure mounted thereto in accordance with a first embodiment of the present invention.

Referring initially to FIG. 1, a bicycle 5 with a seat post fixing structure 25 is illustrated in accordance with a first embodiment of the present invention. The seat post fixing structure 25 is configured and arranged to attach a seat post 21 to the bicycle 5 in a height adjustable manner using a relatively simple, aesthetically pleasing, yet strong structure, as explained below. The bicycle 5 basically includes a frame 11, a drive train or drive unit 14, a handlebar component 15, a front wheel 16f and a rear wheel 16r. The frame 11 basically includes a main frame body 12 and a front fork 13. The frame body 12 curves in a substantially V-shape. The front fork 13 is preferably a suspension fork that is rotatably mounted about an inclined vertical axis within a head tube 12b provided at the front part of the frame body 12. The drive unit 14 is pivotally mounted to the lower part of the frame body 12 to propel the rear wheel 16r. The front wheel 16f is mounted to the distal end of the suspension fork 13, while the rear wheel 16r is mounted to the rear end of the drive unit 14. The handlebar component 15 attached to the top part of the suspension fork 13 to steer the front wheel 16f. The bicycle 5 also preferably has front and rear disc brake units 8f and 8r to selectively apply a braking force to the front and rear wheels 16f and 16r, respectively. A generator hub 17 is mounted in the center of the front wheel 16f, and a hub axle 17a of the generator hub 17 is releasably (removably) fixedly attached to the lower end of the suspension fork 13. The handlebar component 15 has a handlebar stem 18 that is mounted to the suspension fork 13, and a handlebar 19 that is fixedly attached to the handlebar stem 18. The frame body 12 has a hanger component 12a protruding downward from the curved portion, and the drive unit 14 is mounted to the hanger component 12a. The drive unit 14 also preferably has a suspension function to cushion the bicycle 5.

The frame body 12 includes a seat tube 12c that extends diagonally upward toward the rear of the hanger component 12a of the frame body 12. The bicycle seat post 21 is attached at the upper end of the seat tube 12c. A bicycle seat or saddle 20 is mounted to the upper end of the seat post 21. The seat post 21 can be height-adjustably mounted to the seat tube 12c by way of the seat post fixing structure 25 in accordance with this embodiment of the present invention.

Figure 2:
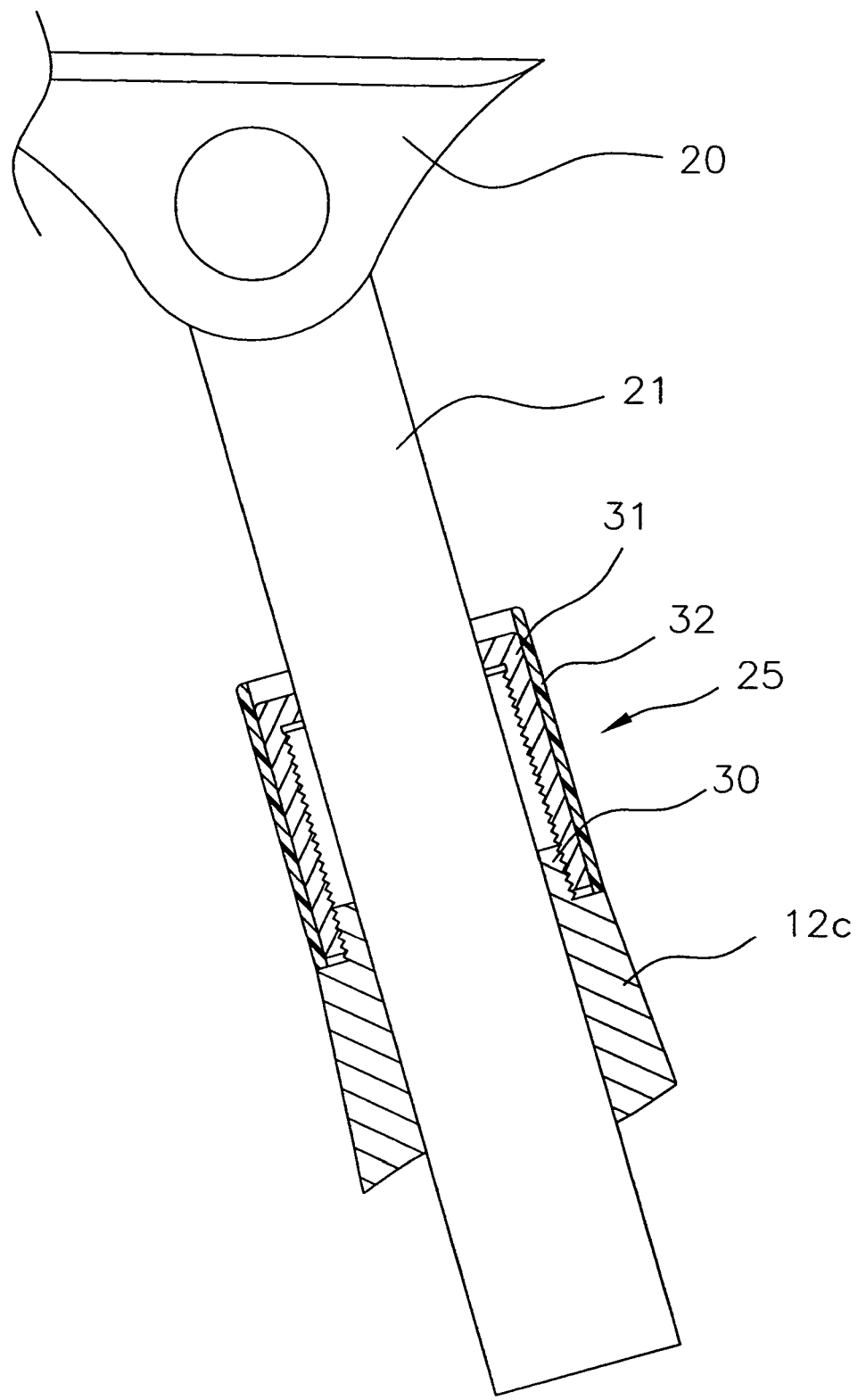
FIG. 2 is an enlarged, partial cross-sectional view of the seat post fixing structure illustrated in FIG. 1, with the seat post received therein.
Figure 4:
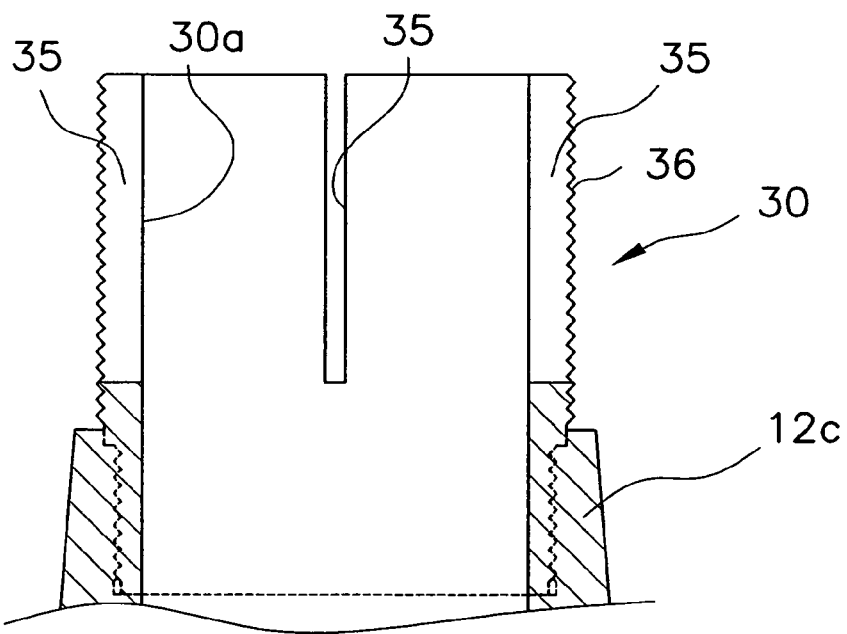
FIG. 4 is a further enlarged, cross-sectional view of the tubular attachment member of the seat post fixing structure illustrated in FIG. 2.
Figure 5:
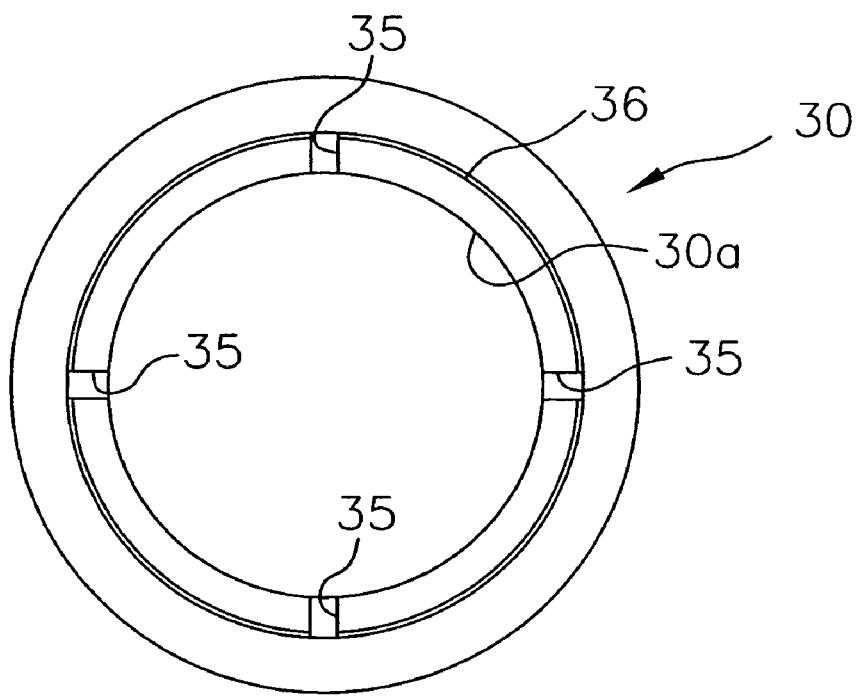
FIG. 5 is a top plan view of the tubular attachment member illustrated in FIG. 4.

The seat post fixing structure 25 is depicted as typically mounted in FIG. 2. The seat post fixing structure 25 includes a tubular attachment member 30 and a tightening member 31. The tubular attachment member 30 that is provided at the upper end of the seat tube 12c and has a (first) inner peripheral surface 30a within which the seat post 21 is movably mounted (received), as best seen in FIGS. 2, 4 and 5. The tightening member 31 threads onto the tubular attachment member 30. Preferably, the tightening member 31 has a cover member 32 for covering (i.e. that overlies the exterior of) the tightening member 31.

In this embodiment, the tubular attachment member 30 is integrally formed with the seat tube 12c at the upper end of the seat tube 12c as a one-piece, unitary member. However, the tubular attachment member 30 could be formed as a separate member from the seat tube 12c that is attached to the seat tube 12c using any suitable well-known fastening means, such as threading, welding, adhesive bonding, or crimping (an example of a threaded attachment illustrated in broken lines in FIG. 4). With such an arrangement, the lower threads illustrated in broken lines form a fastening structure of the tubular attachment member 30 that is configured to be coupled to a seat tube 12c of the bicycle frame 11. In any case, the tubular attachment member 30 is configured to be fixed to the seat tube 12c. The inside diameter of the inner peripheral surface 30a of the tubular attachment member 30 is the same as, or slightly larger than, the outside diameter of the seat post 21. For instance, the inside diameter of the inner peripheral surface 30a is preferably about the same as, or about 0.5 to 2.0 millimeters larger than the outside diameter of the seat post 21. As shown in FIGS. 4 and 5, the tubular attachment member 30 has one or more (i.e. at least one) slit 35 and a (first) male threaded component 36. Preferably, the tubular attachment member 30 has a plurality of (such as four), slits 35 disposed in an equally spaced apart arrangement in the peripheral direction. The male threaded component 36 is formed around the outer peripheral surface of the tubular attachment member 30 extending to the free end of the tubular attachment member 30. The slits 35 are formed so as to be slightly shorter than the overall length of the tubular attachment member 30 in the lengthwise direction and extend downwardly from the upper (free) end of the tubular attachment member 30. Each slit 35 preferably has a slit width which is about 1 to 4 millimeters, for example. The male threaded component 36 can have straight threads or tapered threads whose thread diameter gradually decreases toward the saddle 20. In this embodiment, the male threaded component 36 does not have tapered threads, but straight pipe threads. The male threaded component 36 is formed over the entire length of the outer peripheral surface of the tubular attachment member 30.

Figure 3:
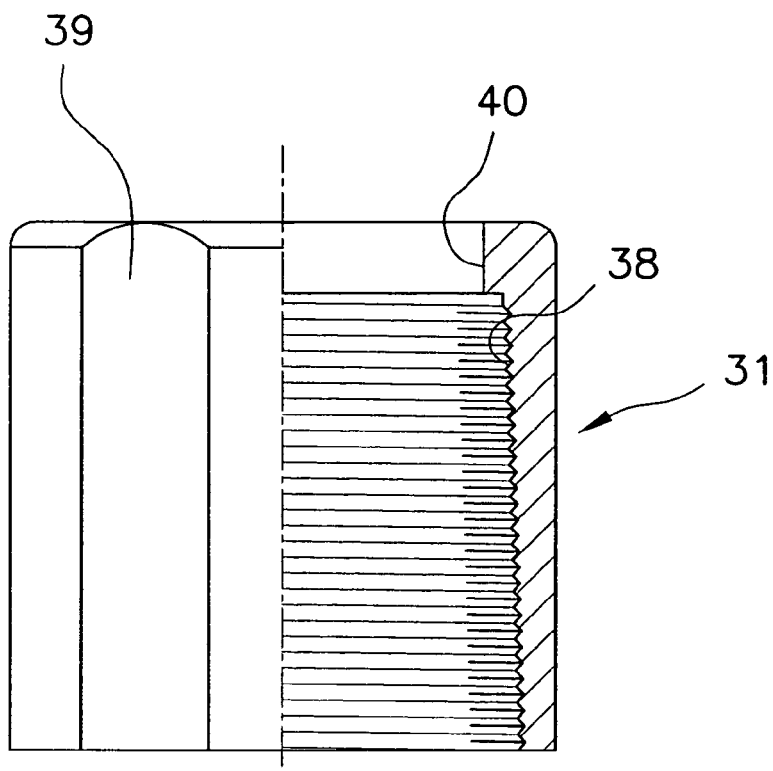
FIG. 3 is a further enlarged, partial cross-sectional view of the tightening member of the seat post fixing structure illustrated in FIG. 2.
Figure 6:
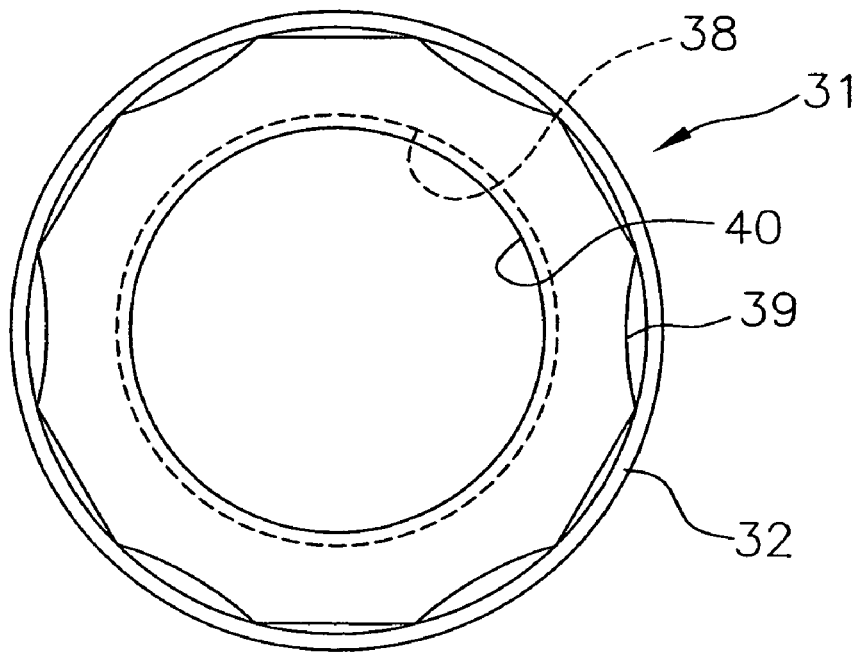
FIG. 6 is a top plan view of the tightening member illustrated in FIG. 3.

The tightening member 31 is a tubular member through which the seat post 21 can pass. As best shown in FIGS. 2, 3 and 6, the tightening member 31 has on its inner peripheral surface a (second) female threaded component 38 that mates with the (first) male threaded component 36. Also, gripping portions 39 (i.e. with convex, flat and/or concave portions, as shown in FIGS. 3 and 6) are provided on the outer peripheral surface. The female threaded component 38 is formed so as to be slightly shorter than the overall length of the tightening member 31, and extends from the lower end of the tightening member 31. A through hole 40 is formed in the upper part of the tightening member 31 to form a (second) inner peripheral surface through which the seat post 21 can be received. The through hole 40 is smaller in diameter than the female threaded component 38 and allows the seat post 21 to pass therethrough. As mentioned above, the male threaded component 36 is a straight pipe thread in this embodiment. On the other hand, in this first embodiment, the female threaded component 38 is a tapered pipe thread whose thread diameter gradually decreases as the saddle 20 is approached.

Figure 14:
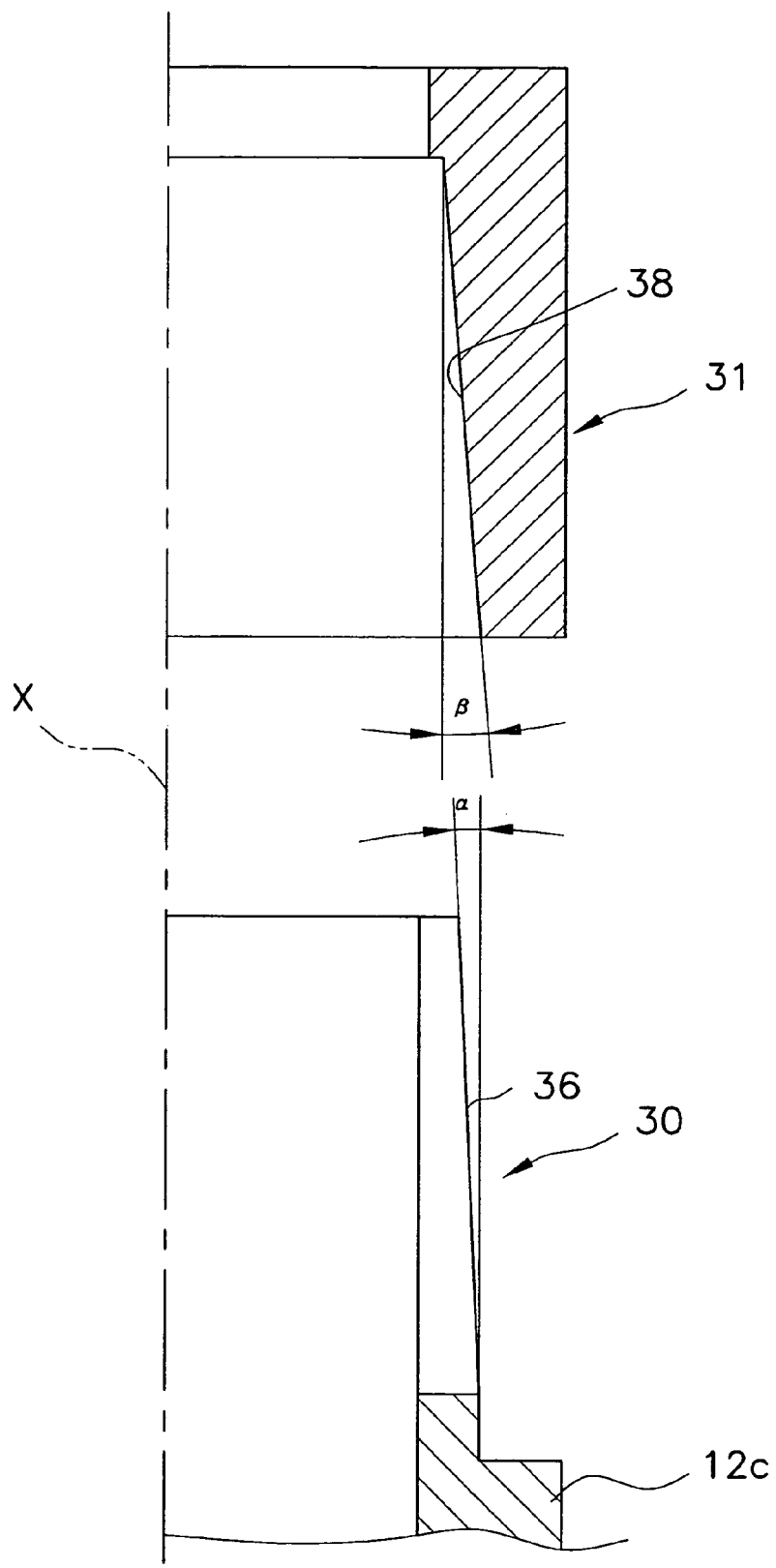
FIG. 14 is a schematic illustration of the tightening member and the tubular attachment member of the first embodiment, illustrating the relationship between the taper angles in the first embodiment.

Alternatively, this embodiment could be modified such that both the male thread component 36 and the female thread component 38 are tapered. The relationship between the male threaded component 36 and the female threaded component 38 when these components both have tapered threads is illustrated schematically in FIG. 14. If we let $\alpha$ be a first taper angle of first tapered threads of the male threaded component 36, and $\beta$ be a second taper angle of second tapered threads of the female threaded component 38, then the two angles $\alpha$ and $\beta$ may be the same or different. In FIG. 14, the first taper angle $\alpha$ is drawn to be smaller than the second taper angle $\beta$, but may instead be larger, or may be the same. Here, the first taper angle $\alpha$ is the angle formed by the male threaded component 36 and a line segment parallel to the axis X of the seat tube 12c, and the second taper angle $\beta$ is the angle formed by the female threaded component 38 and a line segment parallel to the axis X of the seat tube 12c.

In this example illustrated in FIG. 14, when the first taper angle $\alpha$ of the male threaded component 36, which has the first tapered threads, is smaller than the second taper angle $\beta$ ($\alpha<\beta$) of the female threaded component 38, which has the second tapered threads, the initial tightening force during tightening will be relatively low, after which the tightening force will gradually increase, which allows fine tuning of the tightening force. (However, when the second taper angle $\beta$ is set radically higher than the first taper angle $\alpha$, the initial tightening force will be relatively high.)

Conversely, when the first taper angle $\alpha$ of the male threaded component 36, which has the first tapered threads, is larger than the second taper angle $\beta$ ($\alpha>\beta$) of the female threaded component 38, which has the second tapered threads, a relatively high initial tightening force can be generated during tightening, which means that the tightening can be accomplished more quickly.

Referring again to FIGS. 1-6, the gripping portions 39 are formed spaced apart in the peripheral direction on the outer peripheral surface of the tightening member 31. The gripping portions 39 provide a good grip for fingers or optionally for a tool when the tightening member is turned to tighten or loosen the seat post fixing structure 25, making it easier to turn the tightening member 31 with more strength.

With the seat post fixing structure 25 constructed in accordance with this embodiment, when the seat post 21 is initially mounted to the seat tube 12c, the cover member 32 is removed from (i.e. slid axially off of) and disposed above the tightening member 31. In this state, the tightening member 31 is mounted to the seat post 21, and the seat post 21 to which the tightening member 31 has been mounted is mounted to the tubular attachment member 30. In other words, the seat post 21 is inserted through the cover member 32 and then the tightening member 31 while the seat post 21 is removed from the seat tube 12c and the tubular attachment member 30. The seat post 21 is then inserted through the tubular attachment member 30 into the seat tube 12c. The saddle 20 is then adjusted to the desired height, and the tightening member 31 is turned in the tightening direction. As a result, since the male threaded component 36 and/or the female threaded component 38 can have tapered threads, as the tightening member 31 is tightened the tubular attachment member 30 is constricted (i.e. the inner diameter effectively decreases) at the slits 35 and the tubular attachment member 30 tightly squeezes the seat post 21 to fixedly attach the seat post 21 to the tubular attachment member 30. The cover member 32 can then be mounted on the outer peripheral surface of the tightening member 31 so as to cover the tightening member 31 and the tubular attachment member 30 and further enhance the appearance of the bicycle 5.

When the height of the saddle 20 needs to be subsequently adjusted, the tightening member 31 is loosened, whereupon the elasticity of the tubular attachment member 30 causes the tubular attachment member 30 to return to its original shape. Thus, the squeezing force onto the seat post 21 by the tubular attachment member 30 decreases and the seat post 21 can be moved up and down. After the saddle 20 has been adjusted to the desired height, the tightening member 31 is turned in the tightening direction to fix the seat post 21 as discussed above. The cover member 32 can again be removed during this operation such that so the rider can grasp the outer peripheral surface (i.e. the gripping portions 39) of the tightening member 31 by hand or using a tool, if needed and/or desired. Alternatively, the cover member 32 can remain in place if the rider can apply sufficient rotational forces to the tightening member 31 by rotating the cover member 32 by hand.

Here, since the seat post 21 is non-movably (fixedly) attached to the tubular attachment member 30 by turning the tightening member 31 and utilizing the tapered thread arrangement to constrict the tubular attachment member 30, the height of the saddle can be adjusted merely by turning the tightening member 31. This means that a tightening force strong enough to fix the seat post 21 can be obtained by a simple tightening operation, without necessarily having to use a handle or a tool, and the saddle height can be simply adjusted while still achieving an attractive design with few protruding parts. Furthermore, in this embodiment, since the cover member 32 is provided, once the mounting of the seat post 21 is complete, this cover member 32 is mounted to the outer peripheral surface of the tightening member 31 so as to cover the tightening member 31 and the tubular attachment member 30. The result is an even more attractive appearance of the seat post fixing structure 25 than when the cover member 32 is not mounted on the tightening member 31.

Modifications of the First Embodiment

Figure 7:
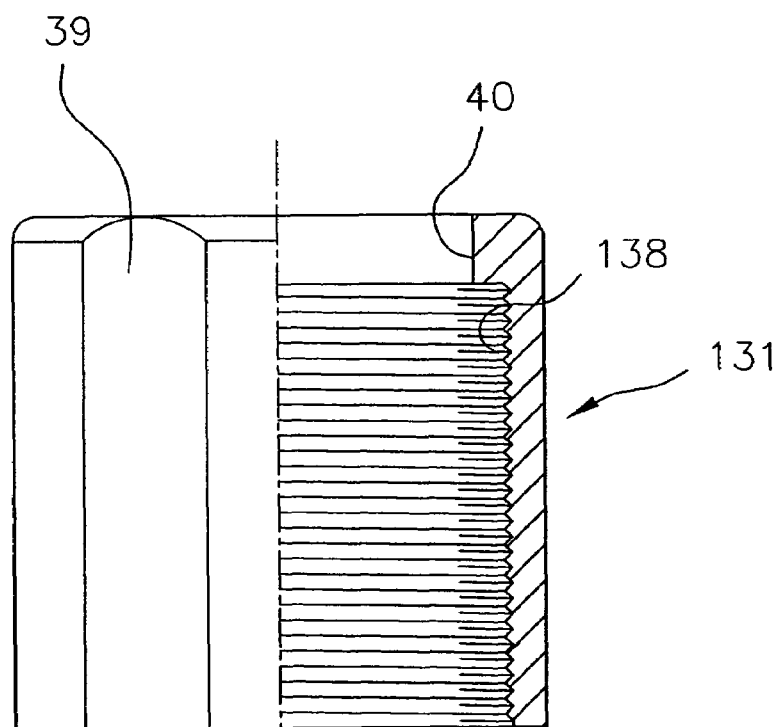
FIG. 7 is an enlarged, partial cross-sectional view of a modified tightening member of a modified seat post fixing structure, which is a modification of the first embodiment.
Figure 8:
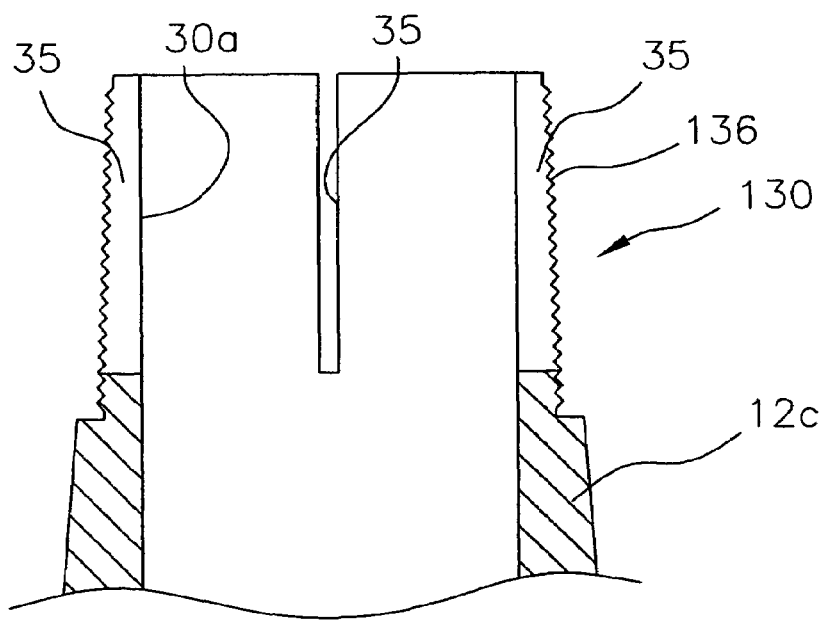
FIG. 8 is an enlarged, cross-sectional view of a modified tubular attachment member (for use with the tightening member of FIG. 7) of a modified seat post fixing structure, which is a modification of the first embodiment.

In the above embodiment, the male threaded component 36 of the tubular attachment member 30 had either tapered threads or straight threads (straight thread illustrated as one preferable arrangement in FIGS. 2, 4 and 6), and the female threaded component 38 of the tightening member 31 had tapered threads. However, the opposite is also acceptable. In accordance with a modification of the first embodiment illustrated in FIGS. 1-6, a (first) male threaded component 136 of a tubular attachment member 130 has tapered threads whose thread diameter gradually decreases toward the saddle 20, and a (second) female threaded component 138 has straight threads or tapered threads (straight threads illustrated as one preferable arrangement in FIG. 7), as shown in FIGS. 7 and 8.

Again in this (reversed) arrangement/modification, just as in the first embodiment, the female threaded component 138 may have tapered threads rather than straight threads.

With the seat post fixing structure created by this further modification (i.e. the female threaded component 138 having tapered threads), when a tightening member 131 (with the female threaded component 138) is turned in the tightening direction, since both the male threaded component 136 and the female threaded component 138 have tapered threads, as the tightening member 131 is tightened, the tubular attachment member 130 is constricted at the slit portion, the seat post 21 is tightly squeezed, and the seat post 21 is fixed to the tubular attachment member 130. Of course, if the female threaded component 138 is a straight thread, the tubular attachment member 130 will also be constricted in a similar manner.

In the adjustment of the saddle height, just as in the first embodiment, the tightening member 131 may be loosened and then tightened again after the saddle has been adjusted to the desired height. Since the above modifications to the first embodiment are relatively minor modifications, these modifications will not be explained and/or illustrated in further detail herein, for the sake of brevity. Moreover, parts illustrated in FIGS. 7 and 8 that are identical to parts of FIGS. 1-6 are given identical reference numerals for the sake of convenience. Furthermore, reference numbers of parts illustrated in FIGS. 7 and 8 that functionally identical to parts of FIGS. 1-6 are given identical reference numerals with "100" added thereto in FIGS. 7 and 8 for the sake of convenience. However, it will be apparent to those skilled in the art from this disclosure that the descriptions and illustrations of the first embodiment illustrated in FIGS. 1-6 also apply to the modifications of the first embodiment discussed above with reference to FIGS. 7 and 8, except as explained and illustrated herein.

Second Embodiment

Figure 9:
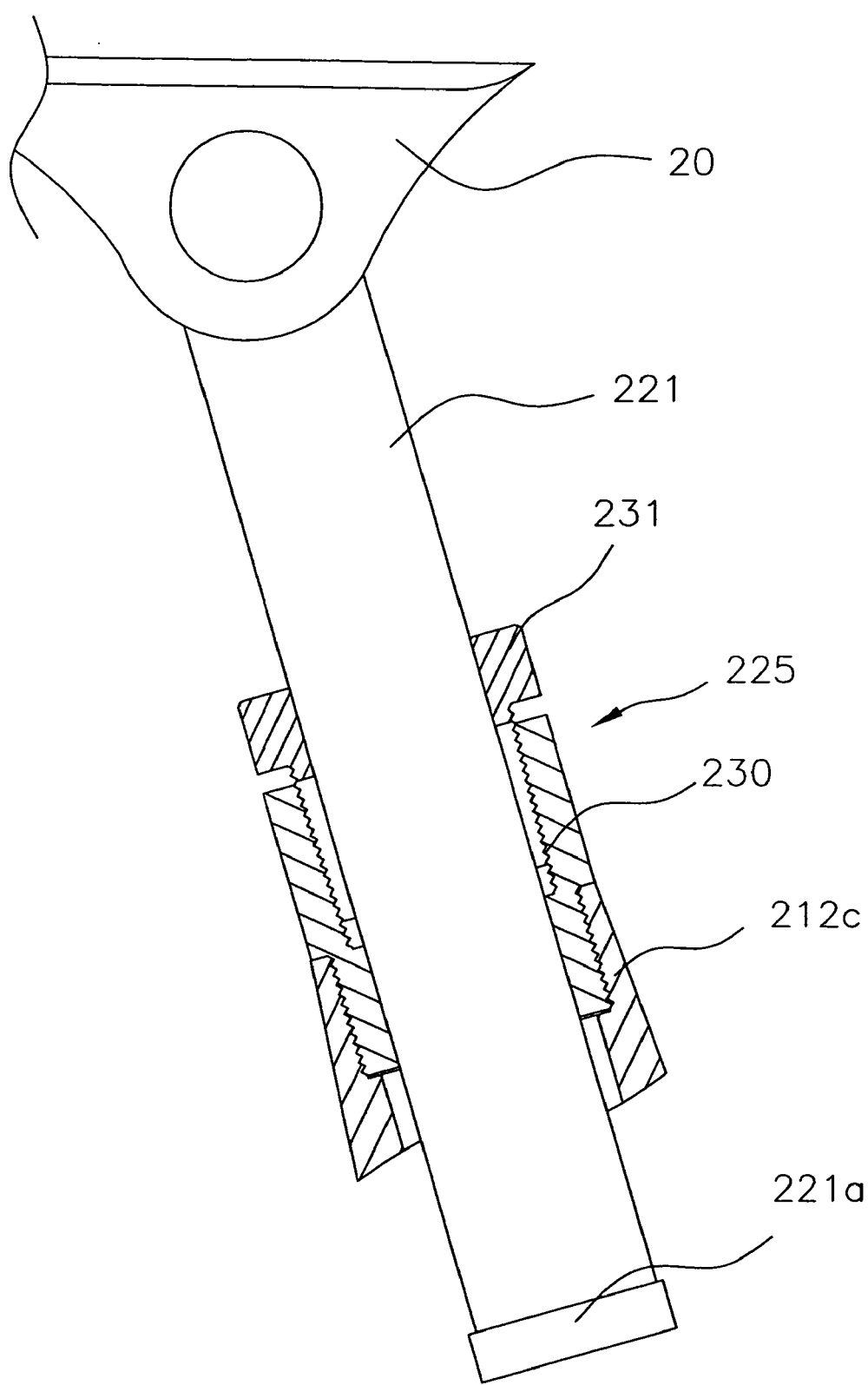
FIG. 9 is an enlarged, partial cross-sectional view of a seat post fixing structure in accordance with a second embodiment of the present invention, with the seat post received therein (corresponding to FIG. 2 of the first embodiment)
Figure 10:
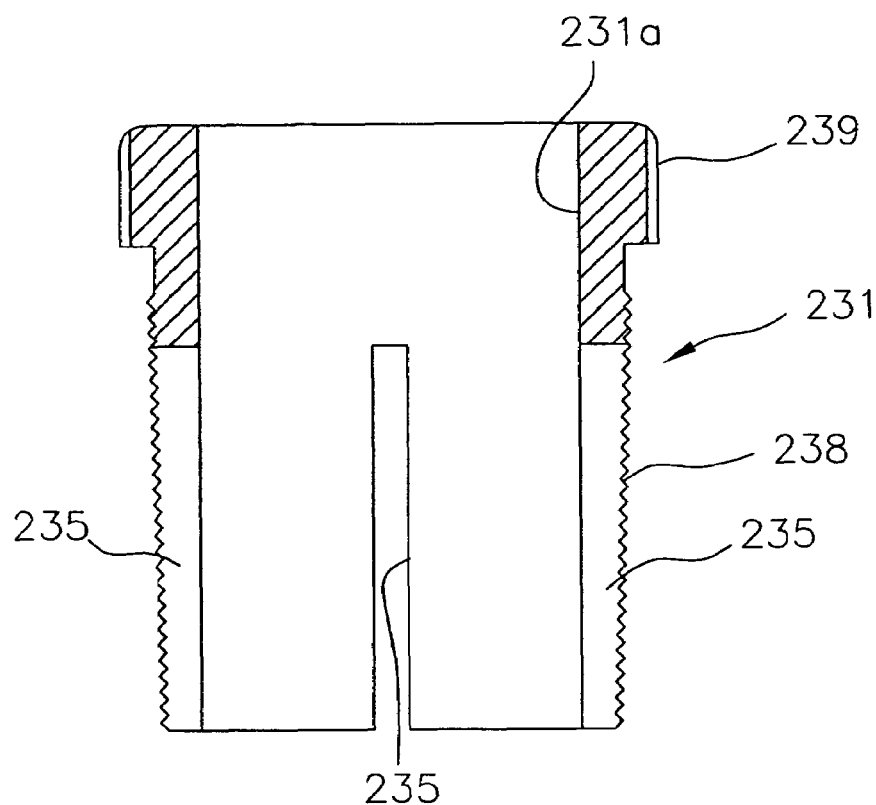
FIG. 10 is a further enlarged, partial cross-sectional view of the tightening member of the seat post fixing structure illustrated in FIG. 9.
Figure 11:
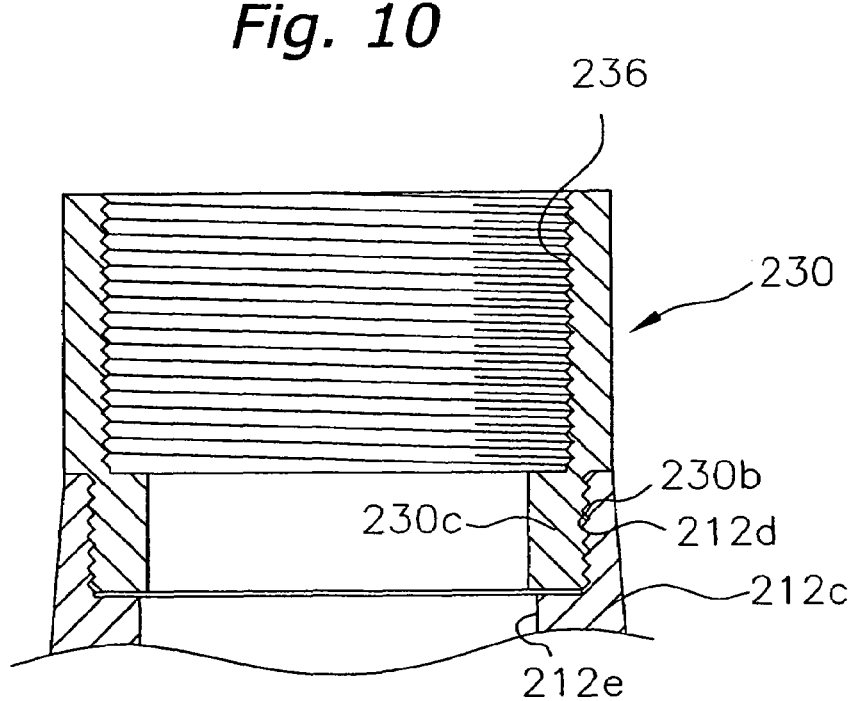
FIG. 11 is a further enlarged, cross-sectional view of the tubular attachment member and the seat tube of the seat post fixing structure illustrated in FIG. 9.

Referring now to FIGS. 9-11, a bicycle seat post fixing structure 225 in accordance with a second embodiment will now be explained. This second embodiment is very similar to the first embodiment. In view of the similarity between the first and second embodiments, the parts of the second embodiment that are identical to the parts of the first embodiment will be given the same reference numerals as the parts of the first embodiment. Thus, the descriptions of the parts of the second embodiment that are identical to the parts of the first embodiment may be omitted for the sake of brevity. Moreover, reference numbers of parts of this second embodiment that functionally identical to parts of the first embodiment will be given identical reference numerals but with "200" added thereto for the sake of convenience. However, in view of the similarity between the first and second embodiments, it will be apparent to those skilled in the art from this disclosure that the descriptions and illustrations of the first embodiment also apply to this second embodiment, except as explained and illustrated herein.

In the first embodiment, a male threaded component was provided to the tubular attachment member, and a female threaded component was provided to the tightening member. However, the opposite is also acceptable.

In FIG. 9, a seat post fixing structure 225 of the second embodiment includes a modified tubular attachment member 230 removably attached to a modified seat tube 212c, and a modified tightening member 231 that threads into the tubular attachment member 230. A modified seat post 221 is used with the modified seat post fixing structure 225. The seat post 221 has a retaining member 221a mounted at its lower end that protrudes radially outwardly (i.e. in the form of a ring) for keeping the seat post 221 from coming off or being completely detached from the seat tube 212c after mounting the seat post 221 to the seat tube 212c with the seat post fixing structure 225. This seat post 221 must be mounted from below the tubular attachment member 230 and the tightening member 231 prior to the mounting of the saddle 20, and only then can the saddle 20 be attached to the upper part of the seat tube.

As shown in FIG. 11, the seat tube 212c has an attachment (auxiliary) female threaded component 212d for attaching the tubular attachment member 230 formed around the inner peripheral surface at the upper end of the seat tube 212c. The tubular attachment member 230 has an externally threaded male section that engages the attachment (auxiliary) female threaded component 212d. Thus, in this embodiment, the tubular attachment member 230 is not integrally formed with the seat tube 212c, but detachably mounted to the seat tube 212c. A (first) female threaded component 236 is formed around the inner peripheral surface of the tubular attachment member 230 for attaching the tightening member 231 thereto. The means for fastening the tubular attachment member 230 to the seat post 212c is not limited to the threaded arrangement mentioned above, and any suitable fastening means, such as welding, adhesive bonding, or crimping, can be employed. Naturally, it will be apparent to those skilled in the art from this disclosure that these means for fastening the tubular attachment member 230 to the seat tube 212c can also be employed in the first embodiment given above, if a tubular attachment member 30 (130) that is a separate member from the seat post 12c is desired. The female threaded component 236 has straight threads or tapered threads that increases in diameter toward the saddle 20 (straight thread illustrated as one preferable arrangement in FIG. 11). In other words, in this second embodiment, the female threaded component 236 has either tapered threads or straight pipe threads. A (second) male threaded component 238 is formed shorter than the overall length of the inner peripheral surface having the female thread component 236 that extends from the upper end of the tubular attachment member 230.

A threaded tube section 230c, on which is formed an attachment (auxiliary) male threaded component 230b that mates with the attachment (auxiliary) female threaded component 212d, is formed at the lower end of the tubular attachment member 230 to protrude downwardly. The threaded tube section 230c forms a fastening structure of the tubular attachment member 230 that is configured to be coupled to a seat tube 212c. Preferably, the outer peripheral surface of the tubular attachment member 230 is formed so as to be substantially aligned with the outer peripheral surface of the seat tube 212c with the attachment (auxiliary) male threaded component 230b having a smaller in diameter than the outer peripheral surface of the tubular attachment member 230. The inner peripheral surface of the threaded tube section 230c is smaller in diameter than the female threaded component 236 and has an inner diameter that allows the passage of the seat post 221 but does not allow the passage of the retaining member 221a. The inside diameter 212e of the seat tube 212c is large enough to allow the passage of the retaining member 221a. As a result, the seat post 221 will not come off upward when attached to the tubular attachment member 230. Preferably, the seat tube 212c has an inner diameter only slightly larger than the outer diameter of the retaining member 221a such that the seat tube 212c provides at least limited support for the lower end of the seat post 221. In this embodiment, the tubular attachment member 230 does not have slits formed therein like the first embodiment.

As shown in FIG. 11, the tightening member 231 has at least one, and preferably a plurality of (such as four), slits 235 disposed in an equally spaced apart arrangement in the peripheral direction, and the male threaded component 238 formed around the outer peripheral surface so as to mate with the female threaded component 236. The tightening member 231 is a tubular member with an inner peripheral surface in which is movably mounted the seat post 221. The inside diameter of the inner peripheral surface 231a of the tightening member 231 is the same as or slightly larger than the outside diameter of the seat post 221. For example, the inside diameter is the same as, or about 0.5 to 2.0 millimeters larger than, the outside diameter of the seat post 221. The slits 235 are formed so as to be slightly shorter than the overall length of the tightening member 231 and extend in the lengthwise direction from the lower end of the tightening member 231, as seen in FIGS. 9 and 10. The slit width is about 2 to 4 millimeters, for example. The male threaded component 238 has tapered threads whose thread diameter gradually increases toward the saddle 20. Specifically, it is a tapered pipe thread as best seen in FIG. 10.

Figure 15:
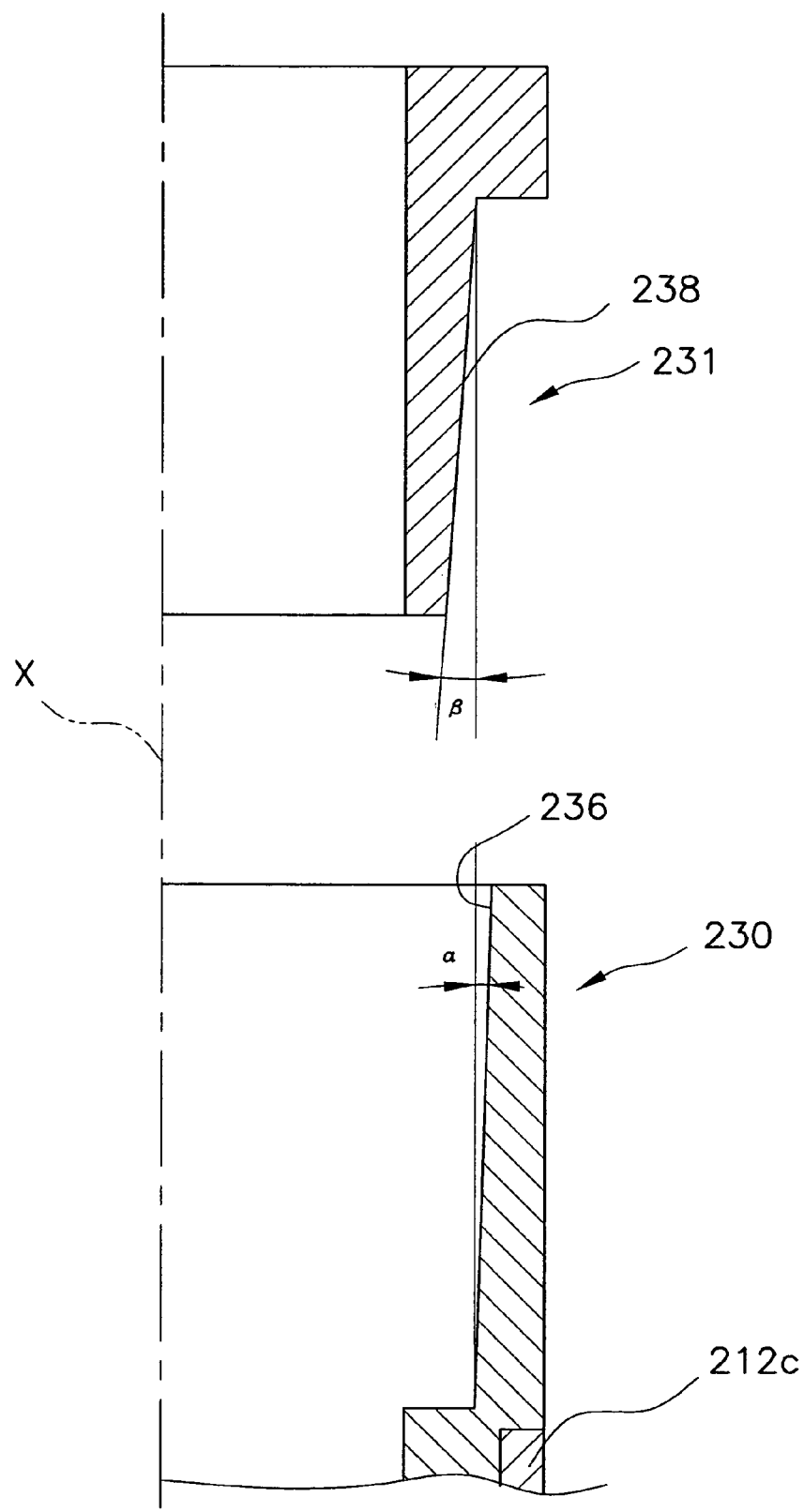
FIG. 15 is a schematic illustration of the tightening member and the tubular attachment member of the second embodiment, illustrating the relationship between the taper angles in the second embodiment.

The relationship between the male threaded component 238 and the female threaded component 236 when these components both have tapered threads is illustrated schematically in FIG. 15. If we let $\alpha$ be a first taper angle of first tapered threads of the female threaded component 236, and $\beta$ be a second taper angle of second tapered threads of the male threaded component 238, then the two angles $\alpha$ and $\beta$ may be the same or different. In FIG. 15, the first taper angle $\alpha$ is drawn to be smaller than the second taper angle $\beta$ (i.e. $\alpha<\beta$), but may instead be larger (i.e. $\alpha>\beta$), or may be the same (i.e. $\alpha=\beta$) in a manner similar to that discussed in the first embodiment. Here, the first taper angle $\alpha$ is the angle formed by the female threaded component 236 and a line segment parallel to the axis X of the seat tube 212c, and the second taper angle $\beta$ is the angle formed by the male threaded component 238 and a line segment parallel to the axis X of the seat tube 212c.

The upper part of the tightening member 231 has gripping portions 239 similar to the gripping portions 39 of the first embodiment formed in the peripheral direction around the outer peripheral surface on the end closer to the saddle 20 than the male threaded component 238. The area with the gripping portions 239 is formed to be larger in diameter than the male threaded component 238. Just as with the gripping portions 39, these gripping portions 239 also provide a good grip for a tool or fingers when the tightening member 231 is turned and tightened or loosened, making it easier to turn the tightening member with more strength.

With the seat post fixing structure 225 constructed as in this second embodiment, since the retaining member 221a is formed on the seat post 221, the seat post 221 is passed through from underneath the tubular attachment member 230 along with the tightening member 231 prior to the attachment of the tubular attachment member 230. In other words, the upper end of the seat post 221 (without the saddle 20 attached thereto) is inserted upward through the lower ends of the tubular attachment member 230 and the then tightening member 231. Then the lower end of the seat tube 221 with the retaining member 221a is inserted into the seat tube 212c, and the tubular attachment member 230 is attached to the seat tube 212c. Anytime after the tubular attachment member 230 and tightening member 231 have been mounted on the seat post 221, the saddle 20 can mounted to the upper end of the seat post 221. However, the saddle 20 is preferably mounted to the seat post 221 prior to mounting the seat post 221 in the seat tube 212c, for convenience. In any case, once the tubular attachment member 230 is attached to the seat tube 212c and the saddle 20 is attached to the seat post 221, the saddle height can be adjusted to the desired level and the tightening member 231 can be tightened to non-movably attach the seat post 221 to the seat tube 212c. In other words, the saddle 20 is disposed at the desired height, and the tightening member 231 is turned in the tightening direction. As a result, since the female threaded component 236 and/or the male threaded component 238 has tapered threads, as the tightening member 231 is tightened, the tightening member 231 is constricted at the slit portion and tightly squeezes the seat post 221, fixing the seat post 221 to the tightening member 231. Since the seat post 221 is fixed to the tightening member 231 by constricting the tightening member 231 by turning the tightening member 231 and utilizing the tapered threads, the height of the saddle 20 can be adjusted merely by turning the tightening member 231. Accordingly, a tightening force strong enough to fix the seat post 221 can be obtained by a simple tightening operation, and the saddle height can be simply adjusted while still achieving an attractive design with few protruding parts. Furthermore, with the second embodiment, since the retaining member 221a is provided, prior to the seat post 221 being mounted to the seat tube 212c, the seat post 221 will not readily come off the tubular attachment member 230, making the saddle 20 less likely to be stolen.

Modifications of the Second Embodiment

Figure 12:
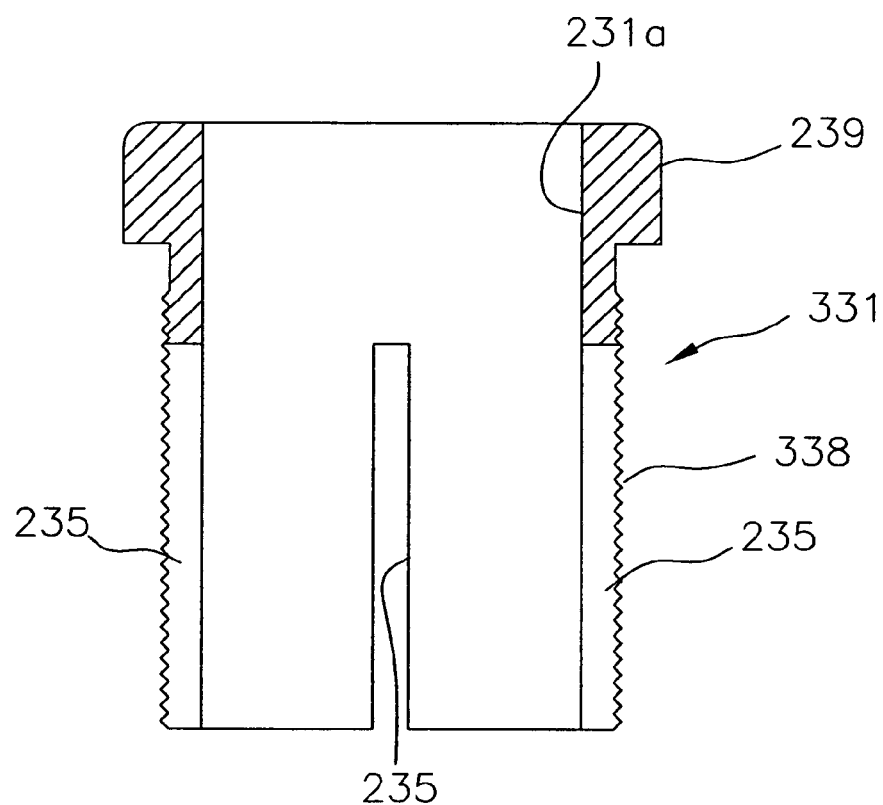
FIG. 12 is an enlarged, partial cross-sectional view of a modified tightening member of a modified seat post fixing structure, which is a modification of the second embodiment.
Figure 13:
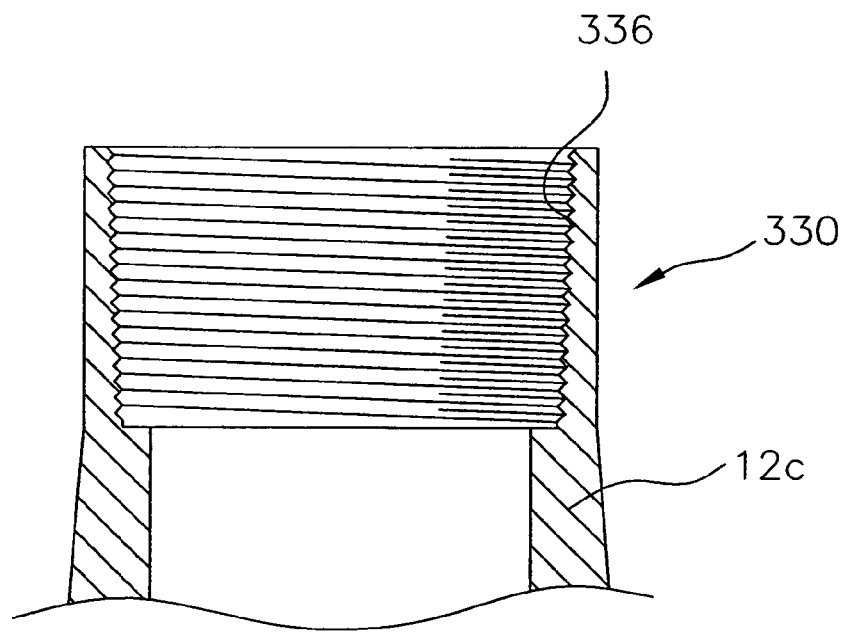
FIG. 13 is an enlarged, cross-sectional view of a modified tubular attachment member (for use with the tightening member of FIG. 12) of a modified seat post fixing structure, which is a modification of the second embodiment.

In the above second embodiment, the female threaded component 236 of the tubular attachment member 230 had either tapered threads or straight threads, and the male threaded component 238 of the tightening member 231 had tapered threads. However, the opposite is also acceptable. In a modification of the second embodiment, as shown in FIGS. 12 and 13, a modified tubular attachment member 330 is formed integrally with the seat tube 12c that includes a (first) female threaded component 336 that has tapered threads whose thread diameter gradually increases toward the saddle 20, and a (second) male threaded component 338 of a modified tightening member 331 is a straight thread. Therefore, the seat post used here is the same seat post 21 as in the first embodiment, and no retaining member is included.

Again in this (reversed) arrangement/modification, just as with the second embodiment (e.g. similar to the modifications of the first embodiment), the male threaded component 338 may have tapered threads rather than straight threads.

With the seat post fixing structure created by this further modification (i.e. the male threaded component 338 having tapered threads), when the tightening member 331 is turned in the tightening direction, since the female threaded component 336 and the male threaded component 338 both have tapered threads, as the tightening member 331 is tightened, the tightening member 331 is constricted at the slit portion, the seat post 21 is tightly squeezed, and the seat post 21 is fixed to the tubular attachment member 330. Of course, if the male threaded component 338 is a straight thread, the tightening member 331 will also be constricted in a similar manner.

In the adjustment of the saddle height with these modifications, just as in the second embodiment, the tightening member 331 may be loosened and then tightened again after the saddle 20 has been adjusted to the desired height. Since the above modifications to the second embodiment are relatively minor modifications, these modifications will not be explained and/or illustrated in further detail herein, for the sake of brevity. Moreover, parts illustrated in FIGS. 12 and 13 that are identical to parts of FIGS. 9-11 are given identical reference numerals for the sake of convenience. Furthermore, reference numbers of parts illustrated in FIGS. 12 and 13 that functionally identical to parts of FIGS. 9-11 are given identical reference numerals with "100" more added thereto (i.e. "300" series) in FIGS. 12 and 13 for the sake of convenience. However, it will be apparent to those skilled in the art from this disclosure that the descriptions and illustrations of the second embodiment illustrated in FIGS. 9-11 also apply to the modifications of the second embodiment discussed above with reference to FIGS. 12 and 13, except as explained and illustrated herein.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle seat post fixing structure configured to adjustably attach a bicycle seat post to a bicycle frame, the bicycle seat post fixing structure comprising:

a tubular attachment member configured to be fixed to the frame, the tubular attachment member including a first threaded component and a first inner peripheral surface configured to receive the seat post; and a tubular tightening member including a second threaded component that mates with the first threaded component and a second inner peripheral surface configured to receive the seat post, one of the first and second threaded components being a female threaded component and the other of the first and second threaded components being a male threaded component having at least one slit formed therein, at least one of the male and female threaded components having tapered threads such that rotation of the tightening member in a tightening direction squeezes the male threaded component to hold the seat post.

2. The bicycle seat post fixing structure according to claim 1, wherein the at least one slit includes a plurality of slits disposed in a spaced arrangement from each other in a peripheral direction about the male threaded component.

3. The bicycle seat post fixing structure according to claim 2, wherein
the slits extend in an axial direction substantially corresponding to an axial movement direction of the seat post during adjustment.

4. The bicycle seat post fixing structure according to claim 1, wherein
the tightening member includes a plurality of gripping portions formed about an outer peripheral surface thereof.

5. The bicycle seat post fixing structure according to claim 1,
wherein the at least one slit extends in an axial direction substanially corresponding to an axial movement direction of the seat post during adjustment.

6. The bicycle seat post fixing structure according to claim 1, wherein
both the male threaded component and the female threaded component have tapered threads.

7. The bicycle seat post fixing structure according to claim 1, wherein
one of the male and female threaded components has tapered threads, and the other of the male and female threaded components has straight threads.

8. The bicycle seat post fixing structure according to claim 1, wherein
the tapered threads are pipe threads.

9. The bicycle seat post fixing structure according to claim 1, wherein
the tubular attachment member includes a fastening structure that is configured to be coupled to a seat tube of the bicycle frame.

10. The bicycle seat post fixing structure according to claim 1, wherein
the first threaded component is the male threaded component and the second threaded component is the female threaded component.

11. The bicycle seat post fixing structure according to claim 10, wherein
the at least one slit includes a plurality of slits disposed in a spaced arrangement from each other in a peripheral direction about the male threaded component.

12. The bicycle seat post fixing structure according to claim 10, wherein
the tightening member includes a plurality of gripping portions formed about an outer peripheral surface thereof.

13. The bicycle seat post fixing structure according to claim 10, wherein
both the male threaded component and the female threaded component have tapered threads.

14. The bicycle seat post fixing structure according to claim 10, wherein
one of the male and female threaded components has tapered threads, and the other of the male and female threaded components has straight threads.

15. A bicycle seat post fixing structure configured to adjustably attach a bicycle seat post to a bicycle frame, the bicycle seat post fixing structure comprising:
a tubular attachment member configured to be fixed to the frame, the tubular attachment member including a first female threaded component and a first inner peripheral surface configured to receive the seat post; and
a tubular tightening member including a second male threaded component that mates with the first female threaded component and a second inner peripheral surface configured to receive the seat post, the second male threaded component having at least one slit formed therein,
at least one of the second male and first female threaded components having tapered threads such that rotation of the tightening member in a tightening direction squeezes the second male threaded component to hold the seat post.

16. The bicycle seat post fixing structure according to claim 15, wherein
the at least one slit includes a plurality of slits disposed in a spaced arrangement from each other in a peripheral direction about the male threaded component.

17. The bicycle seat post fixing structure according to claim 15, wherein the tightening member includes a plurality of gripping portions formed about an outer peripheral surface thereof.

18. The bicycle seat post fixing structure according to claim 15, wherein
both the male threaded component and the female threaded component have tapered threads.

19. The bicycle seat post fixing structure according to claim 15, wherein
one of the male and female threaded components has tapered threads, and the other of the male and female threaded components has straight threads.

20. A bicycle seat post fixing structure configured to adjustably attach a bicycle seat post to a bicycle frame, the bicycle seat post fixing structure comprising:
a tubular attachment member configured to be fixed to the frame, the tubular attachment member including a first threaded component and a first inner peripheral surface configured to receive the seat post; and
a tubular tightening member including a second threaded component that mates with the first threaded component and a second inner peripheral surface configured to receive the seat post,
one of the first and second threaded components being a female threaded component and the other of the first and second threaded components being a male threaded component having at least one slit formed therein,
at least one of the male and female threaded components having tapered threads such that rotation of the tightening member in a tightening direction squeezes the male threaded component to hold the seat post,
the tubular attachment member being an integral, unitary part of a seat tube of the bicycle frame.

* * * * *